(12) United States Patent
Thompson et al.

(10) Patent No.: US 7,677,277 B2
(45) Date of Patent: Mar. 16, 2010

(54) FUEL TANK CAP WITH INTEGRATED CARBON CANISTER

(75) Inventors: Michael B. Thompson, Novi, MI (US); Vaughn K. Mills, Chelsea, MI (US); Peter G. Belanger, Ann Arbor, MI (US); Andrew W. McIntosh, Ann Arbor, MI (US)

(73) Assignee: Eaton Corporation, Cleveland, OH (US)

( * ) Notice: Subject to any disclaimer, the term of this patent is extended or adjusted under 35 U.S.C. 154(b) by 349 days.

(21) Appl. No.: 11/321,512

(22) Filed: Dec. 29, 2005

(65) Prior Publication Data

US 2007/0151628 A1 Jul. 5, 2007

(51) Int. Cl.
*F02M 33/02* (2006.01)
*B65B 3/18* (2006.01)

(52) U.S. Cl. ............... 141/350; 141/301; 220/86.2; 123/519

(58) Field of Classification Search .......... 141/4, 141/301–302, 285, 350; 123/519; 220/86.2
See application file for complete search history.

(56) References Cited

U.S. PATENT DOCUMENTS

| | | | | |
|---|---|---|---|---|
| 4,028,075 A * | 6/1977 | Roberge | ............... | 96/139 |
| 4,572,394 A * | 2/1986 | Tanahashi et al. | ......... | 220/86.2 |
| 4,696,409 A * | 9/1987 | Vize | ............. | 220/203.2 |
| 4,884,716 A * | 12/1989 | Steiner | ............ | 220/202 |
| 5,056,494 A * | 10/1991 | Kayanuma | ............... | 123/519 |
| 5,215,110 A | 6/1993 | Benjey | | |
| 5,261,439 A * | 11/1993 | Harris | ............ | 137/43 |
| 5,676,116 A | 10/1997 | Kim | | |
| 5,964,204 A | 10/1999 | Freeland | | |
| 6,318,423 B1 | 11/2001 | Zapp et al. | | |
| 6,854,486 B2 | 2/2005 | Challender | | |
| 6,854,492 B2 | 2/2005 | Benjey | | |
| 6,866,058 B1 * | 3/2005 | Brock et al. | ............ | 137/202 |
| 6,874,484 B2 | 4/2005 | Benjey | | |
| 6,923,224 B1 | 8/2005 | McClung et al. | | |
| 7,086,389 B2 * | 8/2006 | Yamada | .......... | 123/516 |
| 7,165,536 B2 * | 1/2007 | Kirk et al. | ............ | 123/519 |
| 7,201,155 B2 * | 4/2007 | Mills | .......... | 123/520 |
| 7,225,798 B2 * | 6/2007 | Wang et al. | ............ | 123/518 |
| 7,234,452 B2 * | 6/2007 | Mills | .......... | 123/516 |
| 7,249,595 B2 * | 7/2007 | Mills et al. | ............ | 123/516 |
| 7,261,093 B2 * | 8/2007 | Groom et al. | ............ | 123/520 |
| 7,263,981 B2 * | 9/2007 | Woody | .......... | 123/517 |
| 7,267,112 B2 * | 9/2007 | Donahue et al. | ............ | 123/518 |
| 7,424,844 B2 * | 9/2008 | Carter | .......... | 89/36.07 |
| 7,527,044 B2 * | 5/2009 | Dunkle et al. | ............ | 123/519 |
| 2006/0016436 A1 | 1/2006 | Groom et al. | | |
| 2006/0196481 A1 * | 9/2006 | Mills et al. | ............ | 123/519 |

* cited by examiner

*Primary Examiner*—Gregory L Huson
*Assistant Examiner*—Nicolas A Arnett
(74) *Attorney, Agent, or Firm*—Dykema Gossett PLLC (57) ABSTRACT

A fuel tank cap including a vapor storage receptacle and a discriminator that discriminates between liquid fuel and fuel vapor for protecting the vapor storage receptacle from liquid and adsorbent granulated carbonaceous material. A fuel storage system including a fuel tank cap having a vapor storage receptacle is also disclosed.

15 Claims, 9 Drawing Sheets

FUEL TANK CAP WITH INTEGRATED CARBON CANISTER

TECHNICAL FIELD

The present invention generally relates to fuel storage systems and in particular, to a fuel tank cap.

BACKGROUND

It is known in fuel storage and delivery that it is commonly necessary to vent a fuel tank to relieve vapor pressure build-up which may occur when the fuel tank cap is in place and to permit the escape of air during normal filling operations when the fuel tank cap is removed. Thus, it is known to use an evaporative control system. A typical evaporative control system vents fuel vapor to a vapor storage canister, such as a carbon canister. It is also important to ensure that fuel vapors and/or raw fuel from the tank do not flood the canister during normal engine operation or during filling. Conventional designs for evaporative control systems seek to minimize the canister volume by protecting against fuel tank vapor generation and increasing engine purging of the canister.

Until recently, evaporative emission controls were generally not required for use in connection with small engine fuel tanks. However, current environmental control laws and regulations may now require that fuel tank systems for small engines include safeguards to prevent the excessive escape of fuel vapors under normal operating conditions and to prevent the escape of raw fuel from the tank in the event of a roll inversion. The compact size of such engines can create a particular challenge.

SUMMARY

The present invention recognizes some of these and other problems associated with evaporative emissions systems. The inventive fuel tank cap includes a liquid/vapor discriminator that allows vapor to pass through and prevents liquid from passing through. One embodiment of the fuel tank cap comprises a liquid protected vapor storage receptacle that stores vapors that pass through the discriminator. In another embodiment, a fuel storage system is provided comprising a filler tube connected to a fuel storage tank on one end and having an inlet opening on an opposite end and a fuel tank cap capable of sealingly engaging the inlet opening. In another embodiment, the discriminator prevents liquid from entering a small engine.

DETAILED DESCRIPTION

Figure 1A:
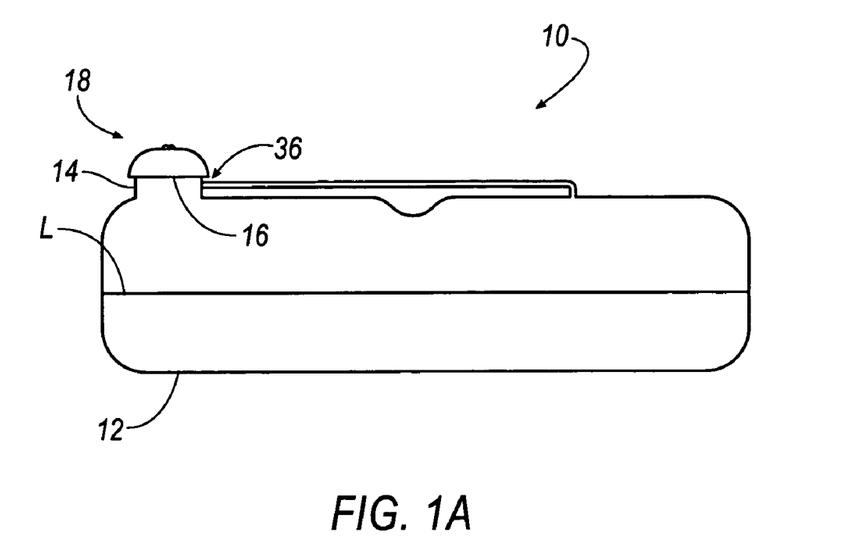
FIG. 1A is a side elevation view of a fuel storage system according to an embodiment of the invention.
Figure 1B:
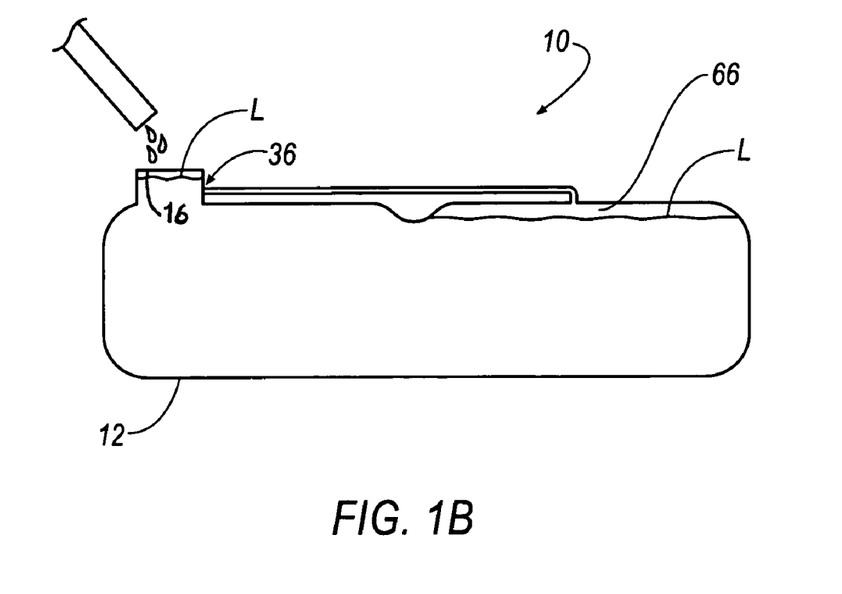
FIG. 1B is a side elevation view of a fuel storage system of the type shown in FIG. 1A illustrated in a substantially filled condition.

Referring to FIGS. 1A and 1B, a fuel storage system 10 is generally shown. The fuel storage system 10 includes a fuel storage tank 12 operatively connected to an engine (not shown). Fuel storage tank 12 contains fuel, with an indicated level L. Fuel storage tank 12 is connected to a filler tube 14. Filler tube 14 extends to an inlet opening, such as, for example, a conventionally-threaded fuel inlet opening 16, which may open to the atmosphere and can be adapted to connect to or receive a fuel tank cap 18.

Figure 2:
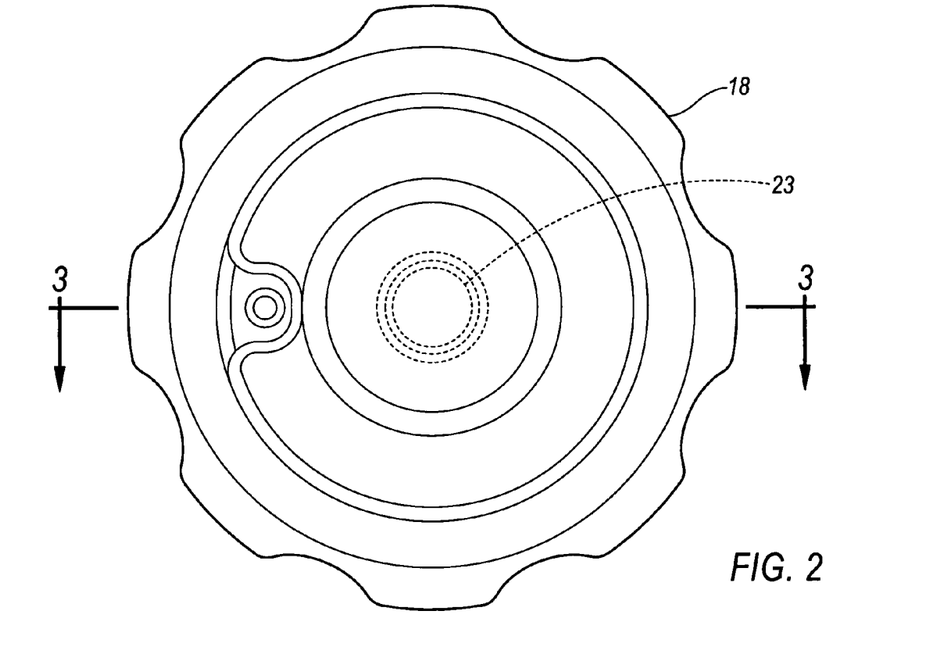
FIG. 2 is a bottom view of an embodiment of a fuel tank cap with an integrated canister.
Figure 3:
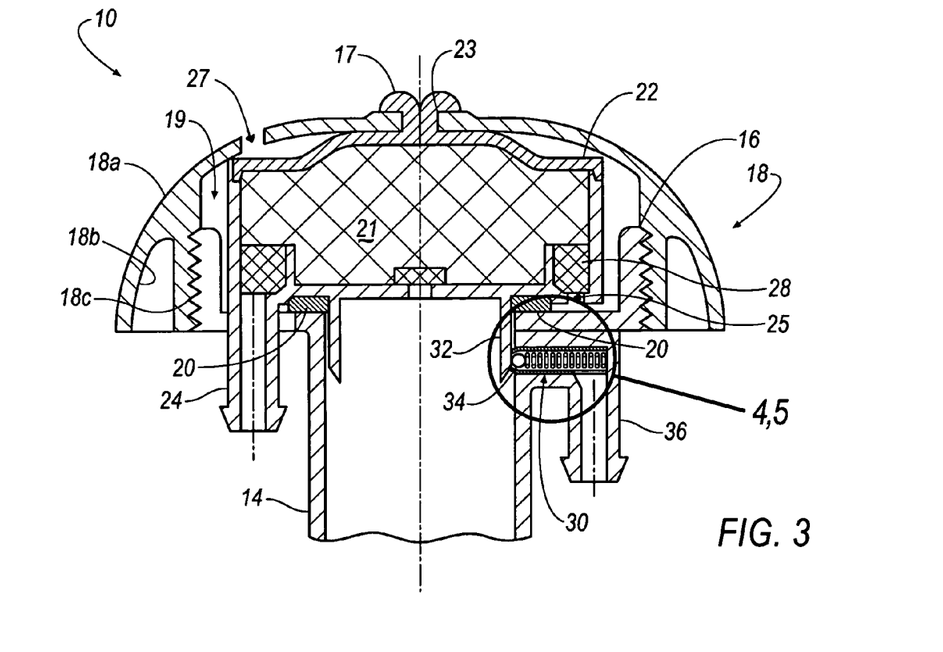
FIG. 3 is a cross-sectional view of a fuel storage system according to an embodiment of the invention and shown taken along line 3-3 of FIG. 2.

Referring now to FIGS. 2 and 3, fuel tank cap 18 includes an outer surface 18a and an inner surface 18b and may further include a partially threaded surface 18c. In the illustrated embodiment, partially threaded surface 18c may extend from interior surface 18b of fuel tank cap 18, forming a cavity 19 therein.

In an installed embodiment, partially threaded surface 18c of fuel tank cap 18 can engage inlet opening 16, which can result in effectively securing fuel tank cap 18 to filler tube 14. A seal 20 may be provided between filler tube 14 and fuel tank cap 18, effectively sealing filler tube 14 and fuel tank 12 from the atmosphere. In such a configuration, the internal pressure in fuel storage tank 12 and filler tube 14 is generally greater than the atmospheric pressure.

Fuel tank cap 18 may further include a means for storing fuel vapors, generally comprising a vapor storage receptacle, such as the illustrated integrated vapor storage receptacle 21. Vapor storage receptacle 21 includes an outer shell, or canister 22. Canister 22 may be packed tightly with an absorbent granulated carbonaceous material, such as, for example, carbon pellets, charcoal, or the like, as is known in the art. The absorbent granulated carbonaceous material may be packed using screens, or filters 28. Further, if desired, a spring loaded volume compensator plate (not shown) may be used to continually push upon the filters 28 to keep the absorbent granulated carbonaceous material in place. Among other things, canister 22 may function as a storage receptacle for fuel vapors and to absorb hydrocarbons which escape from the fuel storage tank 12. Such hydrocarbons can then be combusted back into the engine.

The vapor storage receptacle 21 may be connected or attached to the inner surface 18b of the fuel tank cap 18, within cavity 19. When fuel tank cap 18 is installed, vapor storage receptacle 21 extends downwardly towards fuel storage tank 12. Canister 22 can be generally cylindrical in shape and have a diameter smaller than the diameter of inlet opening 16. However, it can be appreciated that canister 22 may be any particular shape and dimension, so long as fuel tank cap 18 can be disengaged and removed from inlet opening 16, such as during a refueling process, without causing an unacceptable level of interference between fuel tank cap 18 and inlet opening 16.

Vapor storage receptacle 21 may be integrated to fuel tank cap 18 by various methods. As illustrated, vapor storage receptacle 21 can be integrated into fuel tank cap 18 by snap-fitting a portion 17 of vapor storage receptacle 21 into an aperture 23 located on fuel tank cap 18. Alternatively, without limitation, vapor storage receptacle 21 may be integrated into or otherwise connected to the fuel tank cap 18 by threaded engagement, or by welding, such as, for example, ultrasonic welding, spin welding, electro-mechanical welding, or the like. In a further embodiment, the vapor storage receptacle 21 may be integrated into or connected to the fuel tank cap 18 by a friction fit forming between the canister 22 of the vapor storage receptacle 21 and the partially threaded surface 18c of the fuel tank cap 18. It should be noted, in certain situations, such as those illustrated in FIGS. 3, 8 and 9, fuel tank cap 18 and vapor storage receptacle 21 may be integrated in such a manner as to allow fuel tank cap 18 to rotate independent of vapor storage receptacle 21.

However, it can be appreciated by those skilled in the art that vapor storage receptacle 21 may be integrated into or connected to fuel tank cap 18 by any number of methods known in the art, so long as vapor storage receptacle 21 can be connected or attached to inner surface 18b of fuel tank cap 18. For instance, both inner surface 18b and canister 22 may have corresponding threaded surfaces, and as a result, vapor storage receptacle 21 may be integrated to fuel tank cap 18 by screwing the two components together. Further, both the fuel tank cap 18 and the carbon canister 22 may be comprised of a plastic material.

Canister 22 may include an purge line 24 that may be operatively connected to a component of an engine, such as an intake of the engine (not shown). As generally illustrated in the Figures, purge line 24 may also serve as a tether for fuel tank cap 18, which, among other things, may prevent fuel tank cap 18 from being misplaced or lost.

Canister 22 may further include an air inlet, or air aperture 25, covered by a selectively permeable membrane 28. Aperture 25 may be in communication with an aperture 27 on fuel tank cap 18. Aperture 25 allows canister 22 to be open to the atmosphere, while membrane 28 prevents the absorbent granulated carbonaceous material from escaping from canister 22. Aperture 25 and membrane 28 allow atmospheric air to enter canister 22 and amongst other things, refresh the absorbent granulated carbonaceous material.

It can be appreciated that aperture 27 may be located anywhere on fuel tank cap 18 and membrane 28 may be located anywhere on canister 22, so long as aperture 25 and membrane 28 are capable of being operatively engaged and allow canister 22 to be open to the atmosphere. Further, it can be appreciated that the threaded engagement of fuel tank cap 18 with filler tube 14 may allow atmospheric air into cavity 19, thereby serving as an air inlet.

Figure 4:
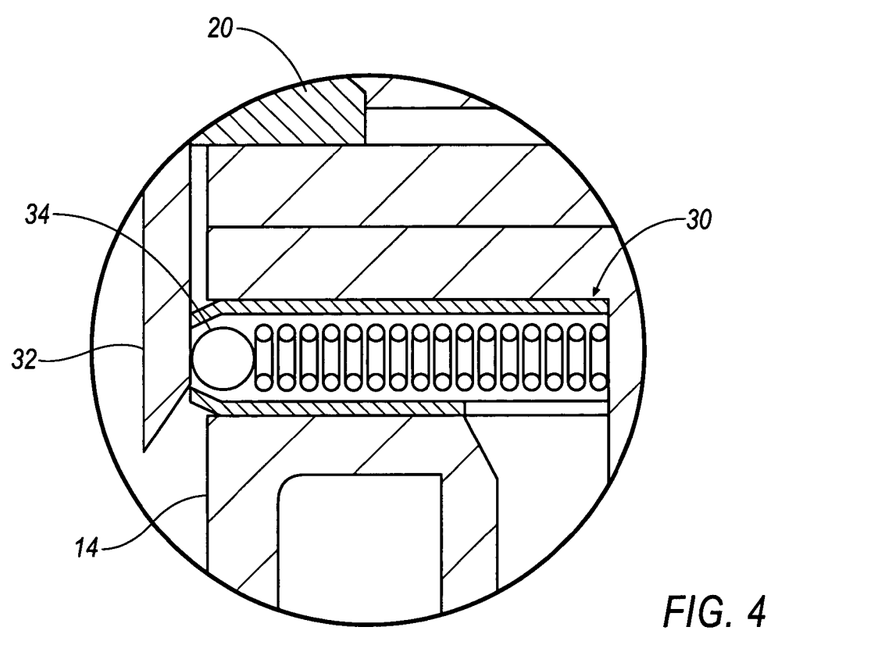
FIG. 4 is an exploded view of an exemplary check valve illustrated in an open position.
Figure 5:
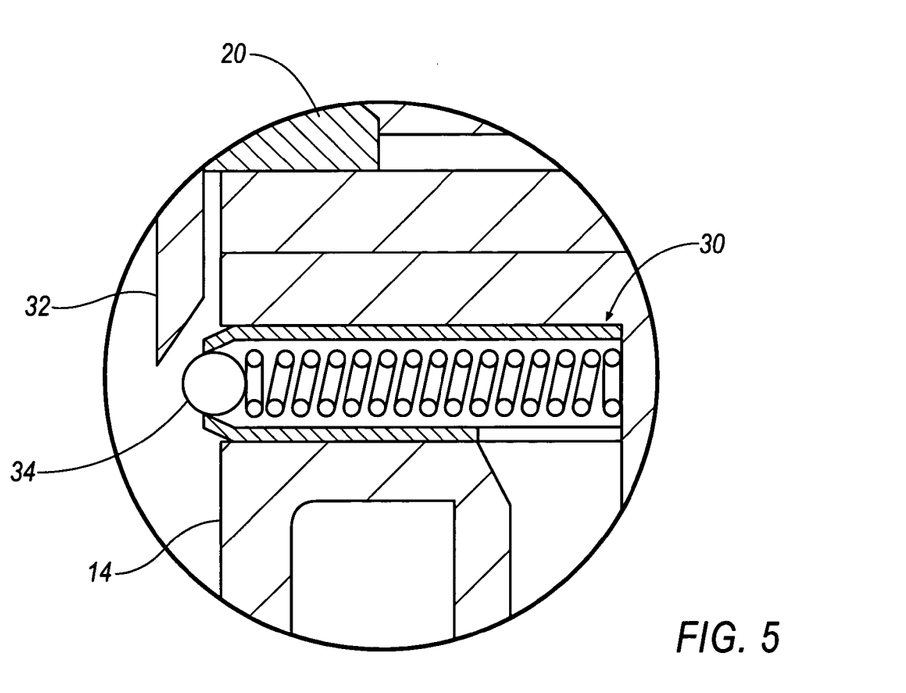
FIG. 5 is an exploded view of an exemplary check valve illustrated in a substantially closed position.

Fuel storage system 10 may further include a check valve 30 within a conduit 36, located along filler tube 14 and proximate to inlet opening 16 (FIGS. 4 and 5). Conduit 36 may connect filler tube 14 to a vapor compartment 66. The check valve 30 is open when the fuel tank cap 18 is properly engaged to inlet opening 16 and is closed when the fuel tank cap 18 is removed from inlet opening 16. During refueling (i.e., when the fuel tank cap 18 is removed from the inlet opening 16), the closed position of the check valve 30 maintains the liquid level inside the vapor compartment 66 of the tank 12. As refueling continues, the liquid level in the inlet opening 16 becomes higher than the liquid level in the vapor compartment 66 due to the maintained pressure in the vapor compartment 66 (FIG. 1B). When the fuel tank cap 18 is replaced after refueling, check valve 30 opens to relieve pressure in the vapor compartment 66 through the conduit 36. This pressure release causes the liquid level in the inlet opening 16 to move down and the liquid level in the vapor compartment 66 to move up so that they equalize. The liquid level drop in the inlet opening creates a vapor space within the inlet opening 16 and allows venting through a rollover valve (described below) in the cap 18.

As generally illustrated in FIG. 4, fuel tank cap 18 may include a means for operating or controlling check valve, such as, for example, a lip 32 that can be included with fuel tank cap 18. Lip 32 is shown engaging a biasing member 34 of check valve 30, which in turn, opens the check valve 30 and allows the passage of fuel vapors between the vapor compartment 66, filler tube 14 and canister 22. However, when fuel tank cap 18 is removed from inlet opening 16, such as, for example, during refueling, lip 32 may disengage biasing member 34, causing check valve 30 to close. Biasing member 34 can be released to block the passage of fuel vapors between the vapor compartment 66 and filler tube 14, for example, as illustrated in FIG. 5. As a result, fuel vapors that enter fuel storage tank 12 during refueling may be restricted from leaving vapor compartment 66. It can be appreciated that while biasing member 34 of check valve 30 is illustrated as a spring loaded ball, the associated valve may be actuated and deactuated by any conventional method.

Figure 6:
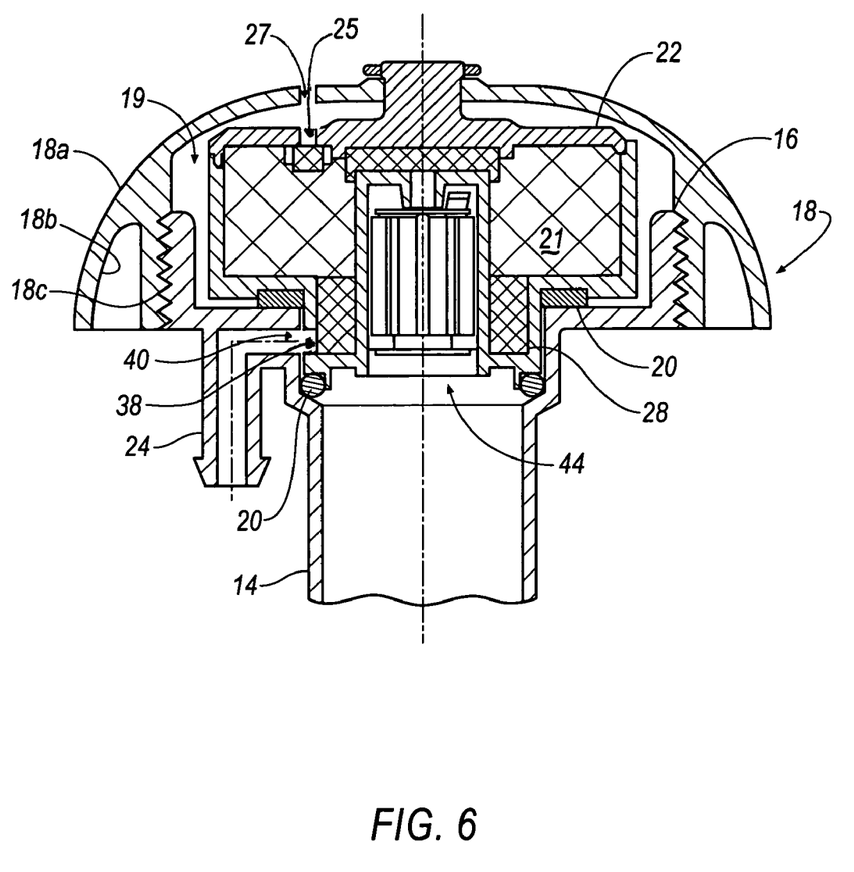
FIG. 6 is a cross-sectional view of a fuel storage system according to another embodiment of the invention.
Figure 7:
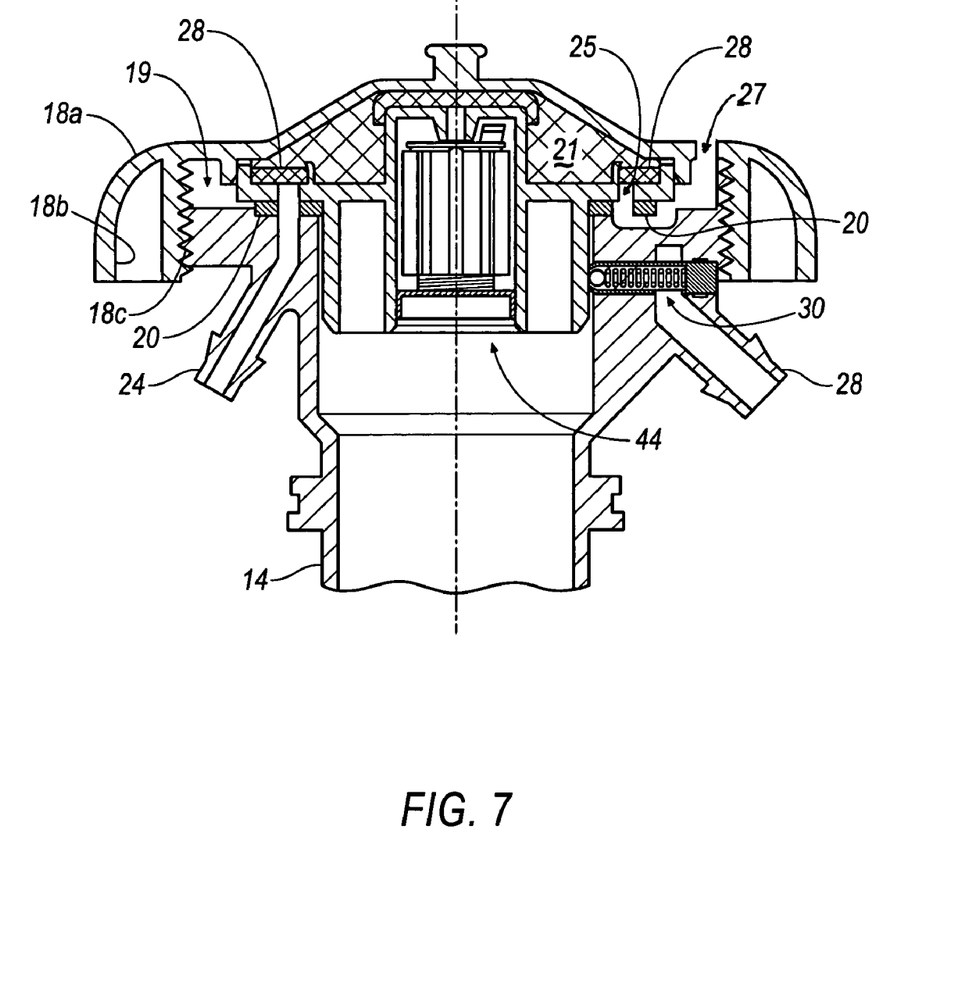
FIG. 7 is a cross-sectional view of a fuel storage system according to another embodiment of the invention.
Figure 8:
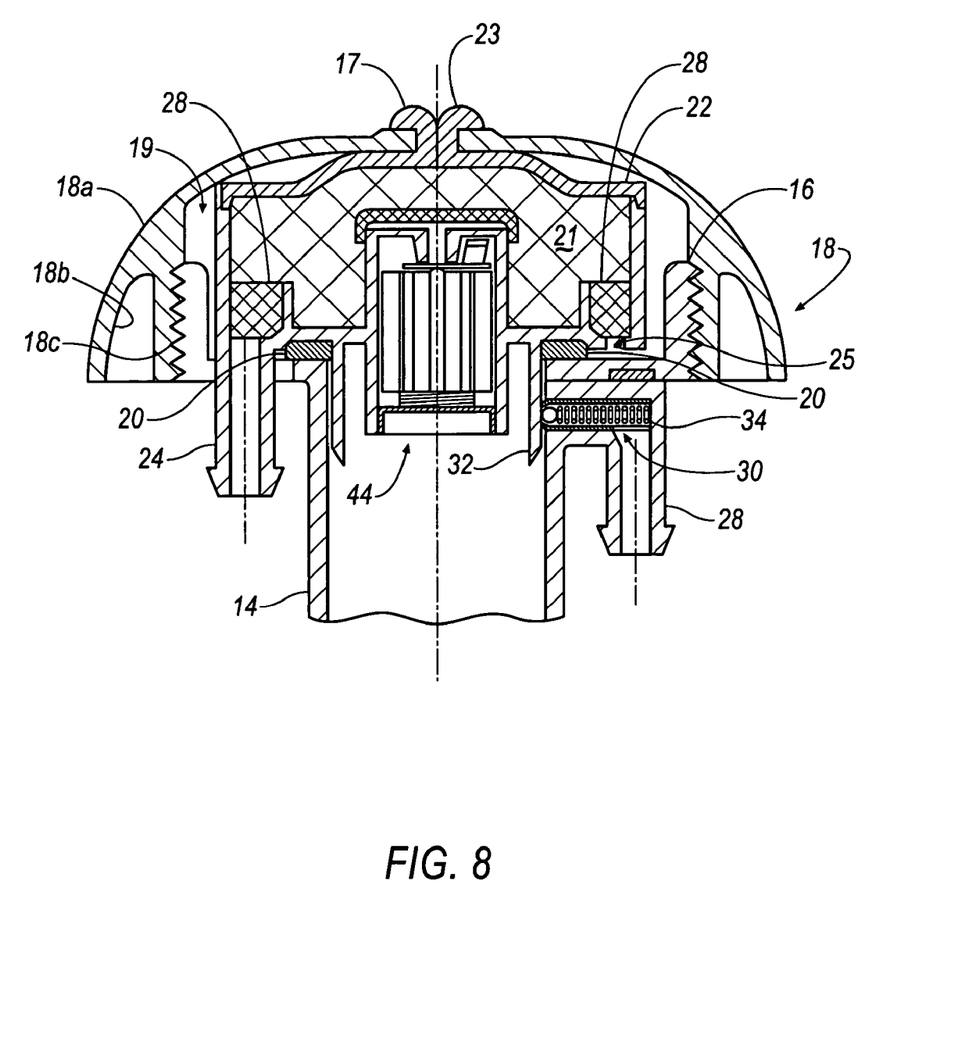
FIG. 8 is a cross-sectional view of a fuel storage system according to another embodiment of the invention.
Figure 9A:
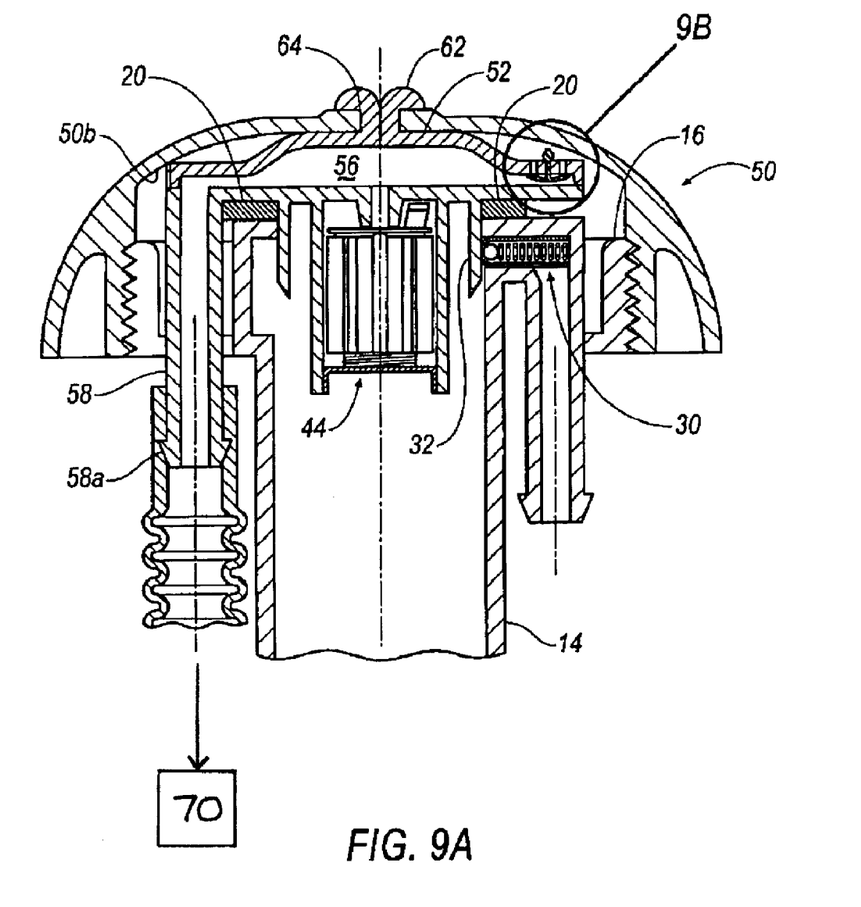
FIG. 9A is a cross-sectional view of a fuel storage system according to another embodiment of the invention.

Referring now to FIGS. 6 through 8, other embodiments of the invention are illustrated. For example, canister 22 of the vapor storage receptacle 21 may further include one or more apertures (such as illustrated aperture 38) along the circumference of canister 22 that allow the fuel vapors stored in the canister 22 to escape. As illustrated, apertures 38 may be aligned with purge line 24. When fuel tank cap 18 is in an installed position, seals 20 may create a flow chamber 40 between apertures 38 and purge line 24. As a result, vapors from vapor storage receptacle 21 are directed to purge line 24, without any vapor escaping from vapor storage receptacle 21.

Fuel tank cap 18 may further include a means for protecting vapor storage receptacle 21 from liquid fuel, such as a liquid discriminator valve, a vapor vent valve, or a rollover valve, or the like. In an illustrated embodiment, the means for protecting vapor storage receptacle 21 is generally shown in the form of a rollover valve 44. The rollover valve 44 may be partially disposed within and operatively engaged to vapor storage receptacle 21. Rollover valve 44 may act as a liquid fuel and fuel vapor discriminator, essentially allowing fuel vapors to enter vapor storage receptacle 21 while preventing liquid fuel from entering into vapor storage receptacle 21. For example, during operation of the engine, fuel may slosh about in fuel storage tank 12 and come into contact with vapor storage canister 21, or in other instances, fuel storage tank 12 may be accidentally or intentionally turned upside down. The rollover valve 44 may prevent intrusion of liquid fuel into vapor storage receptacle 21. It can be appreciated by those skilled in the art that rollover valves are commonly known. It can be further appreciated that the invention is not limited to a rollover valve, and may include any means that protects the vapor storage receptacle from contact with liquid fuel.

Figure 9B:
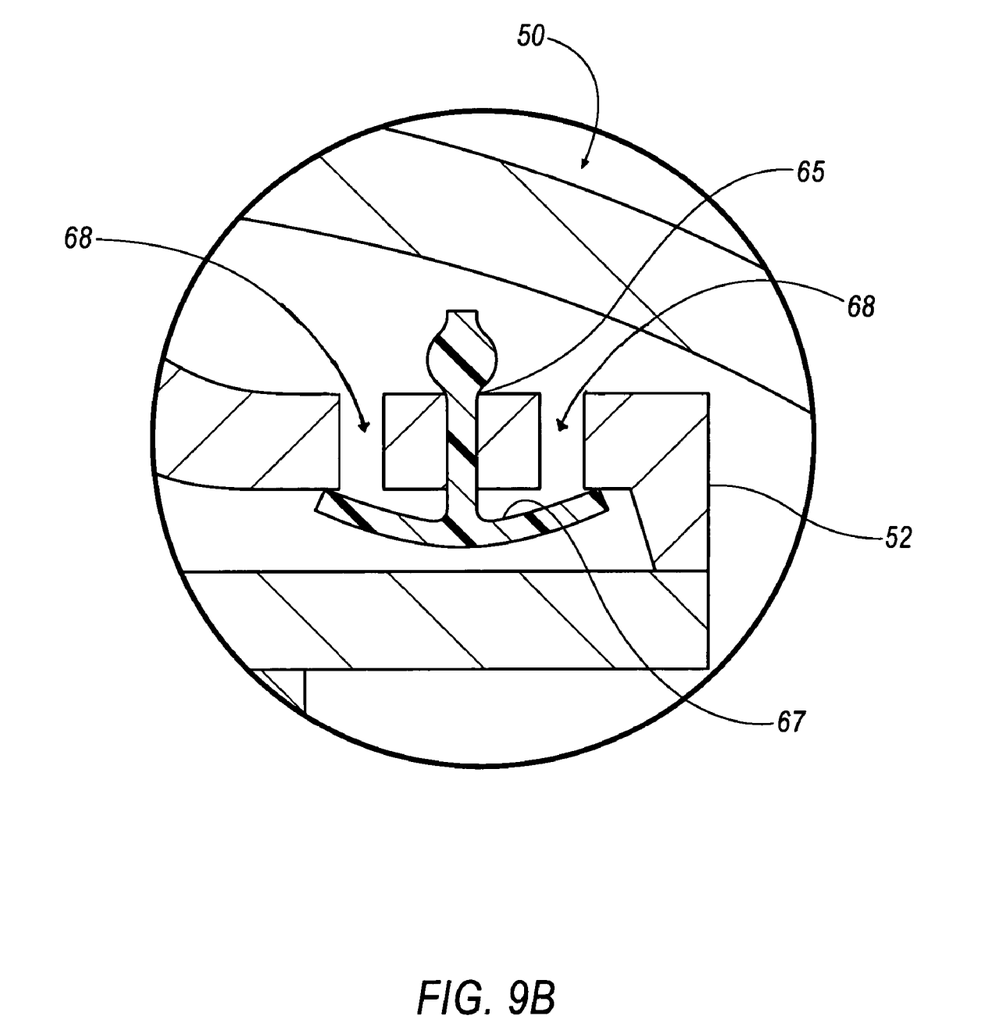
FIG. 9B is an exploded view of the fuel tank cap of FIG. 9A according to another embodiment of the invention.
Figure 10:
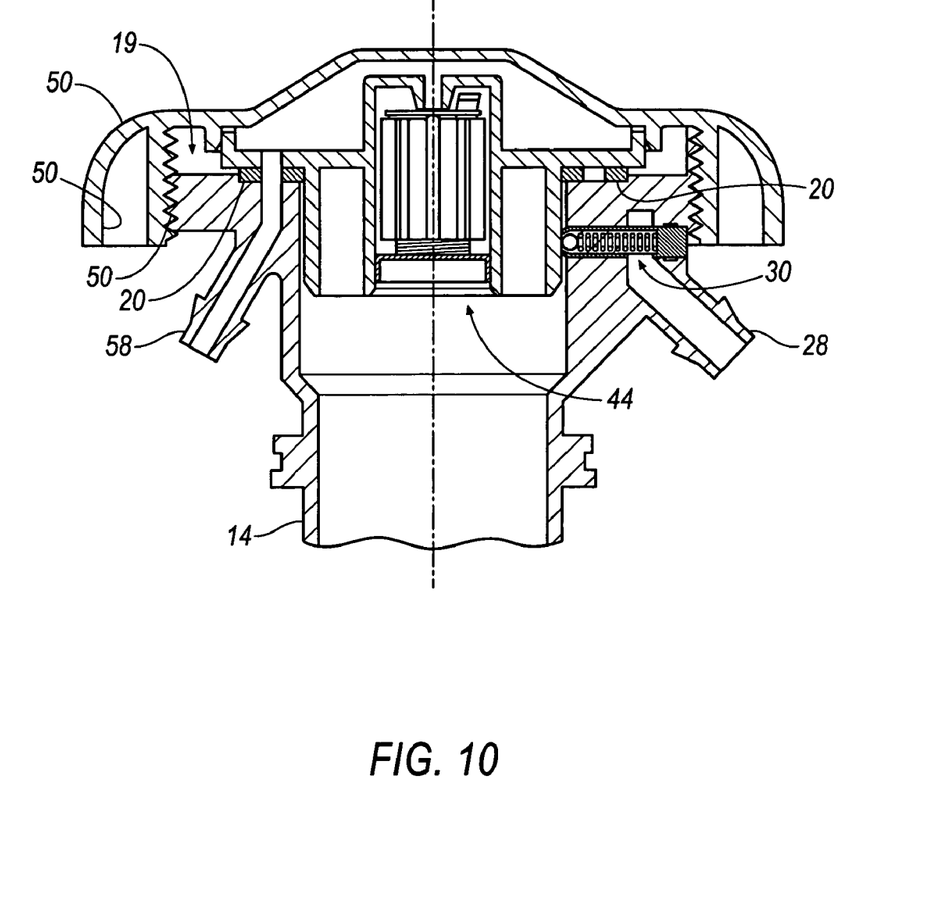
FIG. 10 is a cross-sectional view of a fuel storage system according to another embodiment of the invention.

FIGS. 9A and 9B show a fuel tank cap 50 according to another embodiment of the invention. The fuel tank cap 50 is similar to fuel tank cap 18 and may engage inlet opening 16. This embodiment includes a liquid vapor discriminator 44, such as a rollover valve, and omits the vapor storage device 21. The discriminator 44 allows fuel vapor to pass through it while blocking liquid fuel from passing. This embodiment may be used in a system that purges vapors to a remote vapor storage device 70. Seal 20 may effectively seal filler tube 14 and fuel tank 12 from the atmosphere. However, fuel tank cap 50 includes a vapor flow channel 52 integrated into an inner surface 50b of fuel tank cap 50. The vapor flow channel 52 may provide fluid communication between a remote component 70, such as a vapor storage receptacle, and fuel tank cap 50. Vapor flow channel 52 may define a cavity 56 that extends downward to form a conduit 58. Rollover valve 44 may prevent liquid fuel from entering into cavity 56 and conduit 58.

Vapor flow channel 52 may further include a seal 67, which is capable of acting as a one-way passage for atmospheric air to enter into vapor flow channel 52. Seal 67 may be inserted, or engaged, into a central aperture 65 located on vapor flow channel 52. A plurality of apertures 68, may be located along either side of seal 67, which may provide a means for atmospheric air to enter into vapor flow channel 52. Seal 67 can be configured or shaped such that seal 67 may operatively engage apertures 68 to allow atmospheric air in without allowing fuel vapors out, of vapor flow channel 52. As illustrated in FIGS. 9A and 9B, seal 67 may be T-shaped, such as an umbrella, to engage central aperture 65 and effectively seal apertures 68. However, it can be appreciated that seal 67 may be any size and shape, so long as seal 67 allows for atmospheric air to enter into vapor flow channel 52 without letting fuel vapors from exiting vapor flow channel 52. Further, seal 67 may be manufactured from any material, such as, for example, an elastomeric material.

Conduit 58 may also serve as a tether to prevent the loss of fuel tank cap 50. As illustrated, conduit 58 includes a barbed, or threaded end 58a for engaging the tube connecting to the remote vapor storage receptacle. However, it can be appreciated that conduit 58 may be engaged to vapor storage receptacle by any conventional method.

As illustrated, vapor flow channel 52 may be integrated to fuel tank cap 50 by snap-fitting a pin 62 of vapor flow channel 52 into an aperture 64 in fuel tank cap 50. However, it can be appreciated that vapor flow channel 52 may be integrated into fuel tank cap 50 by methods similar to those described above for integrating vapor storage receptacle 21 to fuel tank cap 18.

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

The invention claimed is:

1. A fuel tank cap comprising:
   a conduit configured to fluidically couple to at least a remote vapor storage receptacle;
   a discriminator configured to discriminate between liquid fuel and fuel vapor to impede liquid fuel from entering the conduit, wherein an outlet of the discriminator is in direct fluid communication with the conduit; and
   a purge line adapted to fluidically couple the remote vapor storage receptacle to an engine,
   wherein the fuel tank cap is configured to be removed from an inlet opening of a filler tube connected to a fuel tank.

2. The fuel tank cap according to claim 1, wherein the fuel tank cap is fluidically coupled to the remote vapor storage receptacle and the remote vapor storage receptacle includes at least one aperture, and wherein the purge line engages at least one aperture to form a flow channel.

3. The fuel tank cap according to claim 1, wherein at least a portion of the purge line forms a tether for the fuel tank cap.

4. The fuel tank cap according to claim 1, wherein the fuel tank cap is fluidically coupled to the remote vapor storage receptacle and the fuel tank cap includes an aperture, and wherein the vapor storage receptacle includes an air inlet, and further wherein the aperture and the air inlet selectively permit air into the vapor storage receptacle.

5. The fuel tank cap of claim 1, wherein the discriminator is one selected from the group consisting of a rollover valve and a vapor vent valve.

6. The fuel tank cap of claim 1, wherein the fuel tank cap has a vapor flow channel configured to provide fluid communication between the cap and the remote vapor storage receptacle.

7. The fuel tank cap of claim 1, further comprising a seal that selectively permits atmospheric air to enter the cap.

8. The fuel tank cap of claim 7, wherein the fuel tank cap has a vapor flow channel configured to provide fluid communication between the cap and the remote vapor storage receptacle, and wherein the seal is disposed in the vapor flow channel.

9. The fuel tank cap according to claim 1, wherein the purge line is configured to fluidically connect the conduit to the engine.

10. A fuel storage system comprising:
    a fuel tank;
    a filler tube connected to the fuel tank; and
    a fuel tank cap adapted to close the filler tube, the fuel tank cap having:
      a vapor storage receptacle integrated into the fuel tank cap;
      a conduit adapted to fluidically couple to at least the vapor storage receptacle, wherein the conduit is separate from the filler tube; and
      a discriminator configured to discriminate-between liquid fuel and fuel vapor to prevent liquid fuel from entering the conduit, wherein an outlet of the discriminator is in direct fluid communication with the conduit.

11. The fuel storage system according to claim 10, wherein the fuel tank cap contains a vapor-absorbing material.

12. The fuel storage system according to claim 10, wherein the vapor storage receptacle further includes a purge line, wherein the purge line is in operative communication between the vapor storage receptacle and a component of an engine.

13. The fuel storage system according to claim 10 further including a check valve that switches between an open position when the fuel tank cap is engaged with the filler neck and a closed position when the fuel tank cap is not engaged with the filler neck.

14. The fuel storage system according to claim 13, wherein the check valve operatively communicates with a vapor compartment in the fuel tank such the check valve maintains a fluid level in the vapor compartment when in the closed position and allows venting of the vapor compartment when in the open position to equalize the fluid level within the fuel tank and the filler tube.

15. The fuel tank cap according to claim 10, wherein the discriminator is at least partially disposed within the vapor storage receptacle.

* * * * *